(12) United States Patent
Nogami et al.

(10) Patent No.: US 12,176,567 B2
(45) Date of Patent: Dec. 24, 2024

(54) SEALED BATTERY

(71) Applicant: SANYO Electric Co., Ltd., Daito (JP)

(72) Inventors: Takahiro Nogami, Osaka (JP); Masayoshi Yoshida, Osaka (JP); Oose Okutani, Hyogo (JP); Akira Takano, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 494 days.

(21) Appl. No.: 17/311,834

(22) PCT Filed: Nov. 13, 2019

(86) PCT No.: PCT/JP2019/044541
§ 371 (c)(1),
(2) Date: Jun. 8, 2021

(87) PCT Pub. No.: WO2020/129480
PCT Pub. Date: Jun. 25, 2020

(65) Prior Publication Data
US 2022/0021072 A1 Jan. 20, 2022

(30) Foreign Application Priority Data

Dec. 21, 2018 (JP) ................. 2018-239241

(51) Int. Cl.
*H01M 50/342* (2021.01)
*H01M 50/152* (2021.01)
*H01M 50/531* (2021.01)

(52) U.S. Cl.
CPC ..... *H01M 50/3425* (2021.01); *H01M 50/152* (2021.01); *H01M 50/531* (2021.01)

(58) Field of Classification Search
CPC ............. H01M 50/107; H01M 50/152; H01M 50/167; H01M 50/3425; H01M 50/531; Y02E 60/10
See application file for complete search history.

(56) References Cited

U.S. PATENT DOCUMENTS

2015/0364735 A1  12/2015  Kohira et al.
2017/0110699 A1*  4/2017  Kohira et al.
(Continued)

FOREIGN PATENT DOCUMENTS

CN       106030850 A      10/2016
KR   10-2016-0121106 A    10/2016
(Continued)

OTHER PUBLICATIONS

English translation of KR Publication 2018-0080847, Jul. 2018.*
(Continued)

*Primary Examiner* — Brittany L Raymond
(74) *Attorney, Agent, or Firm* — WHDA, LLP

(57) ABSTRACT

A sealed battery with a battery case that includes a bottomed cylindrical outer can and an opening-sealing body that closes an opening section of the outer can; and an electrode body that is accommodated inside the battery case. The opening-sealing body includes a metal plate, and the metal plate includes a protruding section that bulges toward the outside of the battery cast, and a flange section that is formed on the circumference of the protruding section. The protruding section includes an inclination section that inclines inward from the radial outside of the opening sealing body so as to be progressively separated from the electrode body, wherein a thin wall section, which has a thickness less than portions other than the inclination section and is preferably (Continued)

broken when the inner pressure of the battery case exceeds a predetermined threshold, is formed in at least a portion of the inclination section.

7 Claims, 3 Drawing Sheets

(56) References Cited

U.S. PATENT DOCUMENTS

| | | | |
|---|---|---|---|
| 2017/0133645 A1* | 5/2017 | Miyata | ................ H01M 10/052 |
| 2018/0047973 A1 | 2/2018 | Kunoike et al. | |

FOREIGN PATENT DOCUMENTS

| | | | |
|---|---|---|---|
| KR | 10-2018-0080847 A | | 7/2018 |
| KR | 2018-0080847 | * | 7/2018 |
| WO | 2014/119308 A1 | | 8/2014 |
| WO | 2015/146077 A1 | | 10/2015 |
| WO | 2016/157749 A1 | | 10/2016 |

OTHER PUBLICATIONS

English Translation of International Search Report dated Feb. 18, 2020, issued in counterpart Application No. PCT/JP2019/044541. (2 pages).
Extended (Supplementary) European Search Report dated Jan. 27, 2022, issued in counterpart EP application No. 19898426.2. (6 pages).
Office Action dated Sep. 28, 2022, issued in counterpart CN application No. 201980080921.4, with English translation. (7 pages).

* cited by examiner

SEALED BATTERY

TECHNICAL FIELD

The present disclosure relates to a sealed battery.

BACKGROUND ART

There is conventionally widely known a sealed battery comprising a battery case including a bottomed tubular exterior can and a sealing assembly sealing an opening of the exterior can (for example, refer to PATENT LITERATURE 1). PATENT LITERATURE 1 discloses a sealed battery comprising a sealing assembly including: is vent member the outer shape of which is a circular shape; a metal plate arranged more inside the battery case than the vent member and connected to the center part of the vent member; and an annular insulating member interposed between the outer periphery of the vent member and the outer periphery of the metal plate. In the sealing assembly, the vent member includes an inclined region the thickness of which continuously decreases along the radial direction from its inner periphery to its outer periphery, and has a downward projecting shape expanding toward the inside of the battery case.

CITATION LIST

Patent Literature

PATENT LITERATURE 1: WO2016/157749

SUMMARY

Technical Problem

Sealing assemblies have a function as a safety vent which fractures when the internal pressure of the battery case rises upon occurrence of abnormality in the battery and enables discharge of gas, and sealed batteries are being requested to inhibit a variation in working pressure of the vent among those to make gas discharge performance more stable. In addition, the sealing assemblies are requested to have predetermined shock resistance so as not to be damaged due to external force which can acts on the batteries in the process of production of these, in the normal state of use of these, or in the other situation.

Solution to Problem

A sealed battery which is an aspect of the present disclosure comprises: a battery case including a bottomed tubular exterior can and a sealing assembly sealing an opening of the exterior can; and an electrode assembly housed in the battery case, wherein the sealing assembly includes a metal plate, and the metal plate includes a projection expanding toward the outside of the battery case, and a flange part formed around the projection. The projection includes an inclined part inclined so as to be gradually apart from the electrode assembly as going toward an inside from an outside of the sealing assembly in a radial direction, and a thin part that has a smaller thickness than a portion except the inclined part and takes priority in fracturing when an internal pressure of the battery case exceeds a predetermined threshold is formed in at least part of the inclined part.

Advantageous Effects of Invention

According to an aspect of the present disclosure, there may be provided a sealed battery which achieves stable gas discharge performance upon occurrence of abnormality in the battery and has excellent shock resistance.

DESCRIPTION OF EMBODIMENTS

For the sealed battery, it is an important problem to realize the stable gas discharge performance upon occurrence of abnormality while securing predetermined shock resistance. The inventors have intensively conducted study on such a problem in order to solve it and have found a novel sealing assembly in which a thin part is formed in an inclined part of a projection expanding toward the outside of the battery case. In general, a conventional sealing assembly has a downward projecting shape as exemplarily shown in PATENT LITERATURE 1, and when the internal pressure of the battery rises, forms a discharge path through shear breakage of an engraved part formed on the metal plate. In this case, in order to cause the engraved part to fracture stably at low internal pressure, the thickness of the engraved part has needed to be very small. Meanwhile, it has been difficult to secure the strength of the sealing assembly so as to be durable against external force such as drop shock and vibration, when the thickness of the engraved part is too small.

A sealing assembly of a sealed battery according to the present disclosure is designed such that a thin part of an inclined part is caused to fracture using tensile stress which acts on the inclined part when the internal pressure of the battery rises. In this case, the gas discharge performance can be realized to be further more stable while maintaining the thickness of the inclined part in such a range that the desired shock resistance can be secured. In other words, according to the sealing assembly of the present disclosure, excellent shock resistance and excellent gas discharge performance can be compatible with each other.

Hereafter, an example of embodiments of the present disclosure will be described in detail. While there is hereafter exemplarily illustrated, as an example of embodiments of a sealed battery according to the present disclosure, a cylindrical battery in which a winding-type electrode assembly 14 is housed in a cylindrical battery case 15, the battery may be a rectangular battery comprising a rectangular battery case. Moreover, the electrode assembly may be a laminate type one configured by alternately laminating a plurality of positive electrodes and a plurality of negative electrodes via separators. In the present specification, the side of a sealing assembly 17 of the battery case 15 will be described as being "upward", and the bottom part side of an exterior can 16 thereof will be described as being "downward" for convenience of description.

Figure 1:
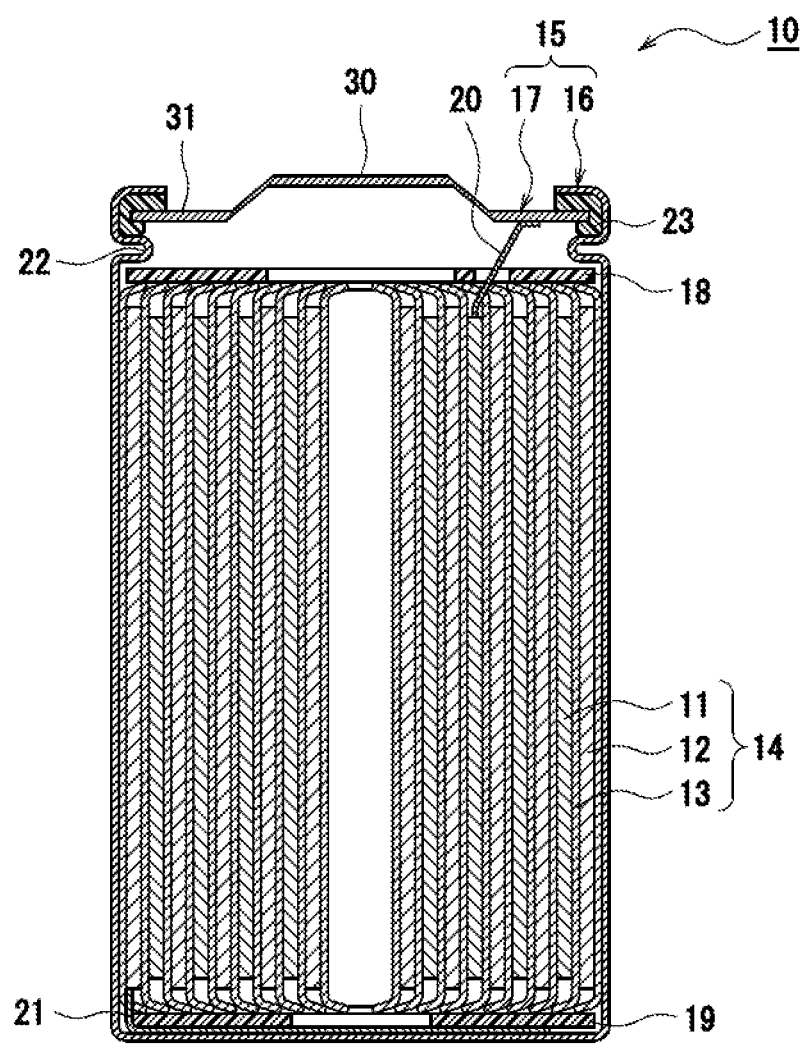
FIG. 1 is a sectional view of a sealed battery which is an example of embodiments.

FIG. 1 is a sectional view of a sealed battery 10 which is an example of embodiments. As exemplarily shown in FIG. 1, the sealed battery 10 comprising: the battery case 15 including the bottomed tubular exterior can 16 and the sealing assembly 17 sealing an opening of the exterior can 16; and the electrode assembly 14 housed in the battery case 15. Moreover, an electrolyte is housed in the battery case 15. The electrode assembly 14 includes a positive electrode 11, a negative electrode 12, and separators 13 interposed between the positive electrode 11 and the negative electrode 12. The electrode assembly 14 has a winding structure configured by winding the positive electrode 11 and the negative electrode 12 via the separators 13. Moreover, the sealed battery 10 comprises a resin-made gasket 23 arranged between the exterior can 16 and the sealing assembly 17.

The electrolyte may be any of an aqueous electrolyte and a non-aqueous electrolyte. A preferable example of the sealed battery 10 is a non-aqueous electrolyte secondary battery, such as a lithium ion battery, using a non-aqueous electrolyte. The non-aqueous electrolyte includes, for example, a non-aqueous solvent and an electrolyte salt dissolved in the non-aqueous solvent. For the non-aqueous solvent, there are used esters, ethers, nitriles, amides, mixed solvents of two or more of these, and the like. The non-aqueous solvent may contain a halogen-substituted substance having halogen atom(s) such as fluorine substituted for at least one or some of hydrogens in these solvents. The non-aqueous electrolyte is not limited to a liquid electrolyte but may be a solid electrolyte using a gelatinous polymer or the like. For the electrolyte salt, there is used a lithium salt such as $LiPF_6$.

The electrode assembly 14 includes the positive electrode 11 which is long, the negative electrode 12 which is long, the two separators 13 which are long, a positive electrode lead 20 joined to the positive electrode 11, and a negative electrode lead 21 joined to the negative electrode 12. In order to inhibit precipitation of lithium, the negative electrode 12 is formed in dimensions one size larger than those of the positive electrode 11. Namely, the negative electrode 12 is formed to be longer in the longitudinal direction and the transverse direction (up-down direction) than the positive electrode 11. The two separators 13 are formed in dimensions one size larger, at least, than the positive electrode 11, and are arranged, for example, so as to interpose the positive electrode 11.

The positive electrode 11 includes a positive electrode current collector, and positive electrode mixture layers provided on both sides of the positive electrode current collector. For the positive electrode current collector, there can be used a foil of a metal such as aluminum and aluminum alloy, which is stable in the potential range of the positive electrode 11, a film having the metal disposed in its surface layers, or the other material. The positive electrode mixture layer includes a positive electrode active material, a conductive agent such as acetylene black, and a binder such as polyvinylidene fluoride (PVdF). The positive electrode 11 can be produced by applying positive electrode mixture slurry including the positive electrode active material, the conductive agent, the binder, and the like onto the positive electrode current collector, and drying, and compressing afterward, the coating film to form the positive electrode mixture layers on both sides of the positive electrode current collector.

For the positive electrode active material, a lithium-transition metal composite oxide is used, for example. Examples of metal elements contained in the lithium-transition metal composite oxide include Ni, Co, Mn, Al, B, Mg, Ti, V, Cr, Fe, Cu, Zn, Ga, Sr, Zr, Nb, In, Sn, Ta, and W. A preferable example of the lithium-transition metal composite oxide is a lithium-transition metal composite oxide containing at least one of Ni, Co, and Mn. Specific examples thereof include a composite oxide containing Ni, Co, and Mn, and a composite oxide containing Ni, Co, and Al.

The negative electrode 12 has a negative electrode current collector, and negative electrode mixture layers provided on both sides of the negative electrode current collector. For the negative electrode current collector, there can be used a foil of a metal such as copper and copper alloy, which is stable in the potential range of the negative electrode 12, a film having the metal disposed in its surface layers, or the other material. The negative electrode mixture layer includes a negative electrode active material, and a binder such as styrene-butadiene rubber (SBR). The negative electrode 12 can be produced by applying negative electrode mixture slurry including the negative electrode active material, the binder, and the like onto the negative electrode current collector, and drying, and compressing afterward, the coating film to form the negative electrode mixture layers on both sides of the negative electrode current collector.

For the negative electrode active material, there is used, for example, graphite such as natural graphite such as flaky graphite, lumpy graphite, and earthy graphite, artificial graphite such as artificial lumpy graphite and graphitized mesophase carbon microbeads, or the other material. For the negative electrode active material, there may be used a metal which is alloyed with lithium, such as Si and Sn, an alloy containing the metal, a compound containing the metal, or the like, and these may be used together with the graphite. Specific examples of the compound include silicon compounds expressed as $SiO_x$ ($0.5 \leq x \leq 1.6$).

Insulating plates 18 and 19 are arranged on the top and the bottom of the electrode assembly 14. In the example of FIG. 1, the positive electrode lead 20 attached to the positive electrode 11 extends to the sealing assembly 17 side through a through hole of the insulating plate 18, and the negative electrode lead 21 attached to the negative electrode 12 extends to the bottom part side of the exterior can 16 through the outside of the insulating plate 19. The positive electrode lead 20 is connected to the inner surface, of the sealing assembly 17, that faces the inside of the battery case 15 by welding or the like, and sealing assembly 17 is a positive electrode external terminal. The negative electrode lead 21 is connected to the inner surface of the bottom part of the exterior can 16 by welding or the like, and the exterior can 16 is a negative electrode external terminal.

As mentioned above, the battery case 15 is constituted of the bottomed tubular exterior can 16 and the sealing assembly 17 sealing the opening of the exterior can 16. The exterior can 16 is a bottomed cylindrical metal-made container. The gasket 23 is provided between the exterior can 16 and the sealing assembly 17 and seals the inner space of the battery case 15. The exterior can 16 includes a grooved part 22 which is formed, for example, by spinning processing on its lateral surface part from the outside and supports the sealing assembly 17. The grooved part 22 is preferably formed into an annular shape along the circumferential direction of the exterior can 16, and supports the sealing assembly 17 on its upper surface. Moreover, the upper end part of the exterior can 16 is folded to the inside of the battery case 15 and crimped on the peripheral edge of the sealing assembly 17. The opening of the exterior can 16 has a circular shape in plan view, and likewise, the sealing assembly 17 also has a circular shape in plan view.

Figure 2:
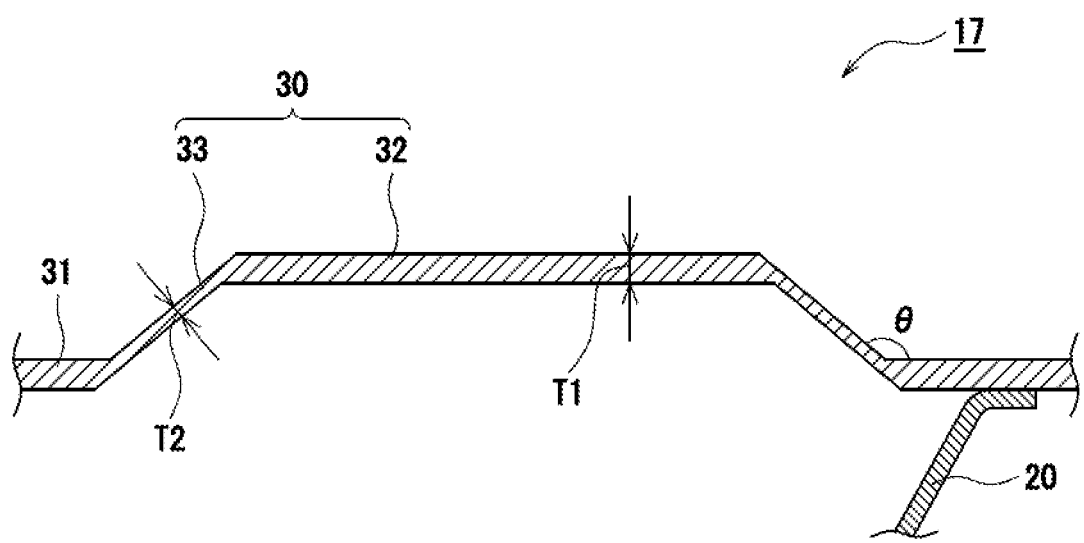
FIG. 2 is a sectional view of a sealing assembly which is an example of embodiments.

Hereafter, the sealing assembly 17 will be described in detail with reference to FIG. 2 and FIG. 3. FIG. 2 is a sectional view of the sealing assembly 17 and FIG. 3 is a plan view of the sealing assembly 17.

Figure 3:
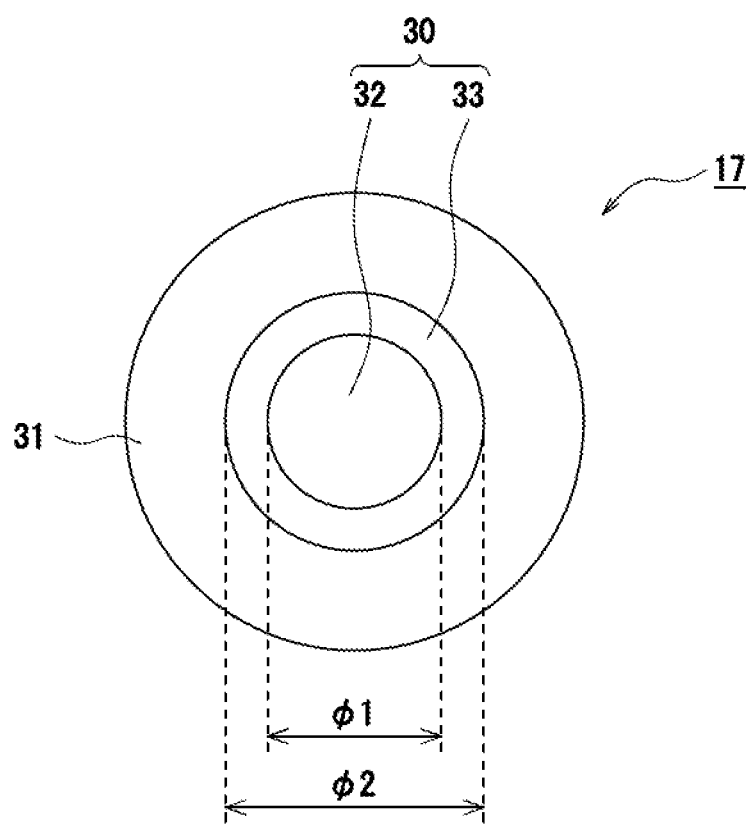
FIG. 3 is a plan view of a sealing assembly winch is an example of embodiments.

As exemplarily shown in FIG. 2 and FIG. 3, the sealing assembly 17 includes a metal plate and has a projection 30 obtained by allowing the metal plate to expand toward the outside of the battery case 15, and a flange part 31 formed around the projection 30. The projection 30 has an upward projecting shape convex toward the upside and includes an inclined part 33 inclined so as to be gradually apart from the electrode assembly 14 as going toward the inside from the outside of the sealing assembly 17 in the radial direction. Further, a thin part which has a smaller thickness than the portion except the inclined part 33 and takes priority in fracturing when the internal pressure of the battery case 15 exceeds a predetermined threshold is formed in at least part of the inclined part 33. The predetermined threshold is properly set based on a battery capacity, a use, and the like.

The sealing assembly 17 is fixed to the exterior can 16 via the gasket 23 by the flange part 31 pinched and held by the upper end part of the exterior can 16 folded to the inside of the battery case 15 and the grooved part 22. The flange part 31 is arranged along the radial direction of the exterior can 16. The projection 30 has a circular shape in plan view and preferably has a substantially perfect circular shape in plan view. Herein, "substantially perfect circular" means to include a perfect circular shape and shapes which can be substantially recognized as a perfect circle. The flange part 31 preferably has an annular shape in plan view having substantially constant inner diameter and outer diameter. The outer diameter of the flange part 31 can be properly modified to meet the shape of the battery case in the case of applying the sealing assembly 17 to a rectangular battery, or the other case.

The sealing assembly 17 does not have a downward projecting shape convex toward the inside of the battery case 15 and does not have an inversion part to deform from a downward projecting shape to an upward projecting shape when the internal pressure of the battery rises. As to a conventional sealing assembly having such an inversion part, since the thickness of the inversion part needs to be small in order to allow plastic deformation, it is difficult to enhance the shock resistance of the sealing assembly. On the other hand, as to the sealing assembly 17 not having an inversion part, the shock resistance can be enhanced in such a range that the thin part fractures when the internal pressure of the battery rises.

The projection 30 preferably has a top part 32 enclosed by the inclined part 33. The top part 32 is a portion most expanding toward the outside of the battery case 15. The top part 32 and the inclined part 33 are preferably flat, and a bent part exists at the boundary position between those. The top part 32 is formed to be substantially parallel to the flange part 31 and arranged along the radial direction of the exterior can 16. In the example shown in FIG. 3, the top part 32 is formed into a substantially perfect circular shape in plan view with the center of the sealing assembly 17 and the projection 30 in the radial direction being as its center. A diameter φ1 of the top part 32 is preferably 20% to 70% of the diameter of the sealing assembly 17, still preferably 35% to 50% thereof.

The inclined part 33 is formed into an annular shape in plan view between the flange part 31 and the top part 32 and formed into a tapered shape which is gradually apart from the electrode assembly 14 as going closer to the top part 32. A bent part having the inclined part 33 bent toward the upside exists at the boundary position between the flange part 31 and the inclined part 33. An angle θ formed by the outer surface of the flange part 31 and the outer surface of the inclined part 33 is preferably 90° to 160°, still preferably 90° to 135°. When the angle θ is in the range, tensile stress readily acts on the inclined part 33 when the internal pressure of the battery case 15 rises, and it is easy to cause the thin part to fracture.

The inclined part 33 preferably has an annular shape in plan view having substantially constant inner diameter and outer diameter. In the example shown in FIG. 3, the inclined part 33 is formed into an annular shape in plan view with the center of the sealing assembly 17 and the projection 30 in the radial direction being a its center. A diameter φ2 of the projection 30 is, for example, 50% to 80% of the diameter of the sealing assembly 17 or 55% to 70% thereof. The diameter φ1 of the top part 32 is, for example, 60% to 80% of the diameter φ2 of the projection 30 or 65% to 75% thereof.

In the sealing assembly 17, the thin part of the inclined part 33 fractures when the internal pressure of the battery case 15 rises upon occurrence of abnormality in the sealed battery 10. Since when the internal pressure of the battery case 15 rises, the tensile stress acts on the inclined part 33, forming the thin part in the inclined part 33 can cause the thin part to fracture using the tensile stress. Therefore, according to the sealing assembly 17, the gas discharge performance can be realized to be further more stable while maintaining the thickness of the inclined part 33 in such a range that the desired shock resistance can be secured.

The sealed battery 10 may have a structure in which the negative electrode lead 21 is connected to the flange part 31. In this case, the sealing assembly 17 is the negative electrode external terminal. Moreover, the sealing assembly 17 may be constituted of a plurality of components in the range which does not impair the object(s) of the present disclosure. Note that in order to reduce the number of components, to reduce the thickness of the sealing assembly 17, and to reduce production costs, the sealing assembly 17 is preferably constituted of one metal plate.

The sealing assembly 17 is, for example, manufactured by performing press processing on one metal plate so as to be convex toward the outside of the battery case 15. A preferable example of the metal plate is an aluminum alloy plate the main component of which is aluminum. The thickness of the metal plate is not specially limited but is 0.2 mm to 2 mm, for example. The thicknesses of the top part 32 and the flange part 31 of the projection 30 may be the same or may be different.

A thickness T2 of the thin part is not specially limited as long as the desired shock resistance can be secured and it fractures when the internal pressure of the battery case 15 rises, but the thickness is preferably set to be 30% to 50% relative to a thickness T1 of the top part 32, still preferably 35% to 45%. When the thickness T2 is not constant, an average thickness or a thickness at the thinnest portion is preferably set as a reference (the same holds true for the thickness T1). A specific example of the thickness T2 is 0.1 mm to 0.3 mm. With the thickness T2 being in this range, high durability and stable gas discharge performance can be compatible with each other. Moreover, the thickness T2 is preferably set to be 30% to 50% relative to the thickness of the flange part 31, still preferably 35% to 45%.

The thin part is preferably formed in a range exceeding 20% of the inclined part 33. Herein, "exceeding 20% of the inclined part 33" means that the area of the thin part exceeds 20% of the total area of the inclined part 33 in the state where the sealing assembly 17 is viewed in plan view (or in bottom view). The thin part may be formed in a range exceeding 50% of the inclined part 33 or may be formed in a range exceeding 90% thereof. The width of the thin part is preferably constant along the circumferential direction of the inclined part 33.

In the present embodiment, the thin part is formed in the whole inclined part 33. Moreover, the thickness T2 of the thin part is substantially constant across the whole inclined part 33. In other words, the thickness of the inclined part 33 is smaller than the thicknesses of the other portions (the flange part 31 and the top part 32) across the whole inclined part 33. The inclined part 33 has, for example, a thickness which is 30% to 50% of the thickness T1 of the top part 32 or 35% to 45% thereof. In the present embodiment, the thickness T1 is also constant across the whole top part 32.

REFERENCE SIGNS LIST

10 sealed battery, 11 positive electrode, 12 negative electrode, 13 separator, 14 electrode assembly, 15 battery case, 16 exterior can, 17 sealing assembly, 18, 19 insulating plate, 20 positive electrode lead, 21 negative electrode lead, 22 grooved part, 23 gasket, 30 projection, 31 flange part, 32 top part, 33 inclined part

The invention claimed is:

1. A sealed battery, comprising:
   a battery case including a bottomed tubular exterior can and a sealing assembly sealing an opening of the exterior can; and
   an electrode assembly housed in the battery case, wherein the sealing assembly includes a metal plate,
   the metal plate includes
   a projection expanding toward the outside of the battery case, and
   a flange part formed around the projection,
   the projection includes an inclined part inclined so as to be gradually apart from the electrode assembly as going toward an inside from an outside of the sealing assembly in a radial direction, and
   a thin part that has a smaller thickness than the flange part and takes priority in fracturing when an internal pressure of the battery case exceeds a predetermined threshold is formed in at least part of the inclined part,
   wherein the smaller thickness of the thin part is less than a thickness at a boundary between the inclined part and the flange part, and
   the projection includes a flat top part enclosed by the inclined part, wherein the inclined part forms an obtuse angle with respect to the flat top part.

2. The sealed battery according to claim 1, wherein
   the metal plate constitutes a top plate of the sealing assembly, and
   an electrode lead connected to a positive electrode or a negative electrode of the electrode assembly is welded to the flange part.

3. The sealed battery according to claim 1, wherein a thickness of the thin part is 30% to 50% of a thickness of the top part.

4. The sealed battery according to claim 1, wherein the thin part is formed in a range exceeding 20% of the inclined part.

5. The sealed battery according to claim 1, wherein a diameter of the flat top part is 60% to 80% of a diameter of the projection.

6. The sealed battery according to claim 1, wherein a thickness of the flat top part is equal to a thickness of the flange part.

7. The sealed battery according to claim 1, wherein the smaller thickness of the thin part constitutes a thickness of an entirety of the inclined part.

* * * * *